(12) United States Patent
Ucasz

(10) Patent No.: US 10,975,703 B2
(45) Date of Patent: Apr. 13, 2021

(54) ADDITIVELY MANUFACTURED COMPONENT FOR A GAS POWERED TURBINE

(71) Applicant: United Technologies Corporation, Farmington, CT (US)

(72) Inventor: Mark T. Ucasz, Middletown, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 642 days.

(21) Appl. No.: 15/336,132

(22) Filed: Oct. 27, 2016

(65) Prior Publication Data
US 2018/0119553 A1 May 3, 2018

(51) Int. Cl.
| | |
|---|---|
| *F01D 5/18* | (2006.01) |
| *B22F 5/04* | (2006.01) |
| *F01D 5/08* | (2006.01) |
| *B22F 3/105* | (2006.01) |
| *B22F 5/00* | (2006.01) |
| *B33Y 80/00* | (2015.01) |

(52) U.S. Cl.
CPC ............ *F01D 5/187* (2013.01); *B22F 3/1055* (2013.01); *B22F 5/009* (2013.01); *B22F 5/04* (2013.01); *B33Y 80/00* (2014.12); *F01D 5/081* (2013.01); *F05D 2220/32* (2013.01); *F05D 2230/22* (2013.01); *F05D 2230/30* (2013.01); *F05D 2230/31* (2013.01); *F05D 2250/75* (2013.01); *F05D 2260/2212* (2013.01); *F05D 2260/22141* (2013.01)

(58) Field of Classification Search
CPC . F01D 5/187; F01D 5/081; F01D 5/08; F01D 5/183; F01D 5/189

USPC ......................................... 415/115; 416/97 R
See application file for complete search history.

(56) References Cited

U.S. PATENT DOCUMENTS

| | | | |
|---|---|---|---|
| 5,403,156 A * | 4/1995 | Arness | F01D 5/081 |
| | | | 29/889.21 |
| 6,491,496 B2 | 12/2002 | Starkweather | |
| 6,933,459 B2 | 8/2005 | Helder et al. | |
| 7,704,039 B1 * | 4/2010 | Liang | F01D 9/04 |
| | | | 415/116 |
| 8,801,366 B2 | 8/2014 | Dueckershoff et al. | |
| 8,827,647 B1 * | 9/2014 | Liang | F01D 5/187 |
| | | | 416/97 R |
| 9,353,634 B2 | 5/2016 | Grohens et al. | |

(Continued)

FOREIGN PATENT DOCUMENTS

| | | |
|---|---|---|
| EP | 1717416 | 2/2006 |
| EP | 2905538 | 8/2015 |

(Continued)

OTHER PUBLICATIONS

Fousová, Michaela & Vojtech, D. & Kubásek, Jiří & Dvorský, D. & Machová, Markéta. (2015). 3D printing as an alternative to casting, forging and machining technologies?. (Year: 2015).*

(Continued)

*Primary Examiner* — Aaron R Eastman
(74) *Attorney, Agent, or Firm* — Carlson, Gaskey & Olds, P.C.

(57) ABSTRACT

A gaspath component includes a body having at least one internal cooling passage and a metering feature integral to the internal cooling passage. The metering feature and the body are a unitary structure.

14 Claims, 4 Drawing Sheets

(56) References Cited

U.S. PATENT DOCUMENTS

| | | | |
|---|---|---|---|
| 9,393,620 B2 | 7/2016 | Bales et al. | |
| 2003/0138320 A1* | 7/2003 | Flatman | F01D 5/187 |
| | | | 415/116 |
| 2006/0051208 A1* | 3/2006 | Lee | F01D 5/187 |
| | | | 416/97 R |
| 2007/0189898 A1* | 8/2007 | Hooper | F01D 5/187 |
| | | | 416/97 R |
| 2012/0063916 A1* | 3/2012 | Boyer | F01D 5/187 |
| | | | 416/97 R |
| 2013/0043324 A1* | 2/2013 | Hodgson | F23R 3/28 |
| | | | 239/76 |
| 2015/0159494 A1* | 6/2015 | Carrier | F01D 9/02 |
| | | | 415/175 |
| 2015/0345298 A1 | 12/2015 | Mongillo et al. | |
| 2015/0345304 A1 | 12/2015 | Mongillo et al. | |
| 2015/0345396 A1 | 12/2015 | Zelesky et al. | |

FOREIGN PATENT DOCUMENTS

| | | |
|---|---|---|
| EP | 2942487 | 11/2015 |
| EP | 3067533 | 9/2016 |
| WO | 2014052323 | 4/2014 |
| WO | 2014150490 | 9/2014 |
| WO | 2015069466 | 5/2015 |
| WO | 2015108849 | 7/2015 |

OTHER PUBLICATIONS

European Search Report for Application No. 17198141.8 dated Apr. 4, 2018.

\* cited by examiner

ADDITIVELY MANUFACTURED COMPONENT FOR A GAS POWERED TURBINE

TECHNICAL FIELD

The present disclosure relates generally to additively manufactured gas powered turbine components, and more specifically to cooling passage features of the same.

BACKGROUND

Gas turbine engines generally operate by compressing a gas in a compressor and providing the compressed gas to a combustor. In the combustor the compressed gas is mixed with a fuel, and ignited generating high temperature combustion gasses. The high temperature combustion gasses are then expanded across a turbine section, driving the turbine section to rotate. Rotation of the turbine section, in turn, drives the compressor to rotate. In some gas powered turbines, such as a geared turbofan, the rotation of the turbine section further drives the rotation of a fan forward of the compressor.

The high temperature combustion gasses expose the gaspath components to substantial amounts of thermal cycling and heat stress. In order to reduce the thermal stresses on any given flowpath component, the flowpath components are actively cooled. In some examples, the active cooling is achieved via cooling passages internal to the flowpath component.

Typical methods of manufacturing gaspath components include various methods of removing material from a starting blank of material to form a desired completed part shape and casting a desired completed part shape around an investment casting core. Such methods utilize cutting tools and casting cores to form holes, surfaces, passages, overall shapes and more.

In some examples, once the completed part is formed one or more metering components are connected to the completed part at the inlet of the internal cooling passages. The metering components meter the flow of coolant into the internal cooling passages.

SUMMARY OF THE INVENTION

In one exemplary embodiment a gaspath component includes a body having at least one internal cooling passage, a metering feature integral to the internal cooling passage, and the metering feature and the body being a unitary structure.

In another example of the above described gaspath component the body and the metering feature are comprised of the same material.

In another example of any of the above described gaspath components the at least one internal cooling passage includes at least one turbulating feature.

In another example of any of the above described gaspath components the at least one turbulating feature is a plurality of trip strips.

In another example of any of the above described gaspath components the metering feature is downstream of at least one of the at least one turbulating features.

In another example of any of the above described gaspath components the metering feature comprises a plate spanned the internal cooling passage and having at least one opening.

In another example of any of the above described gaspath components the plate includes a plurality of openings.

In another example of any of the above described gaspath components the at least one opening includes at least one geometric feature protruding into the opening.

In another example of any of the above described gaspath components the at least one opening is tapered.

In another example of any of the above described gaspath components the at least one internal cooling passage is a plurality of cooling passages, wherein a first subset of the cooling passages include the metering feature and a second subset of cooling passages are characterized by a lack of the metering feature.

In another example of any of the above described gaspath components the metering feature is internal to the at least one internal cooling passage.

In another example of any of the above described gaspath components the metering feature has a thickness parallel to an expected flow of fluid through the metering feature, and the thickness is at least 37 mils.

In another example of any of the above described gaspath components the metering feature has a thickness parallel to an expected flow of fluid through the metering feature, and the thickness is at most 8 mils.

In another example of any of the above described gaspath components the body and the metering feature are a single additively manufactured component.

An exemplary method of manufacturing a gaspath component includes simultaneously manufacturing a component body including a plurality of internal cooling passages, and manufacturing at least one metering feature interior to one of the internal cooling passages.

In another example of the above described exemplary method of manufacturing a gaspath component simultaneously manufacturing the component body including the plurality of internal cooling passages, and manufacturing the at least one metering feature interior to one of the internal cooling passages comprises additively manufacturing the component body and the metering feature.

Another example of the above described exemplary method of manufacturing a gaspath component further includes constructing the metering feature upstream of at least one turbulating feature.

In another example of any of the above described exemplary methods of manufacturing a gaspath component simultaneously manufacturing the component body including the plurality of internal cooling passages, and manufacturing the at least one metering feature interior to one of the internal cooling passages further comprises manufacturing a plurality of turbulating features within the internal cooling passages, downstream of the metering feature.

In another example of any of the above described exemplary methods of manufacturing a gaspath component simultaneously manufacturing the component body including the plurality of internal cooling passages, and manufacturing the at least one metering feature interior to one of the internal cooling passages comprises manufacturing the component body and the metering feature as a single unitary structure of a single material.

In another example of any of the above described exemplary methods of manufacturing a gaspath component simultaneously manufacturing the component body including the plurality of internal cooling passages, and manufacturing the at least one metering feature interior to one of the internal cooling passages comprises manufacturing the component body of a first material and the metering feature of a second material, distinct from the first material, as a single unitary structure.

These and other features of the present invention can be best understood from the following specification and drawings, the following of which is a brief description.

DETAILED DESCRIPTION OF AN EMBODIMENT

An alternative manufacturing process to the above described casting and machining processes is an additive manufacturing process, such as electron beam melting (EBM) and direct metal laser sintering (DMLS). In some examples, such as the DMLS example, additive manufacturing utilizes a heat source such as a laser beam to melt layers of powdered metal to form the desired part configuration layer upon layer. The laser forms a melt pool in the powdered metal that solidifies. Another layer of powdered material is then spread over the formerly solidified part and melted to the previous melted layer to build a desired part geometry layer upon layer. Powdered material that is applied but not melted to become a portion of the part accumulates around and within the part.

In basic examples, the powder material utilized in each iteration of the process is identical, resulting in a structure created of a uniform material. In more advanced examples, the powders applied at each iteration can be varied and include different material compositions, allowing the end part to be a single unitary structure with portions constructed of two or more distinct materials.

Figure 1:
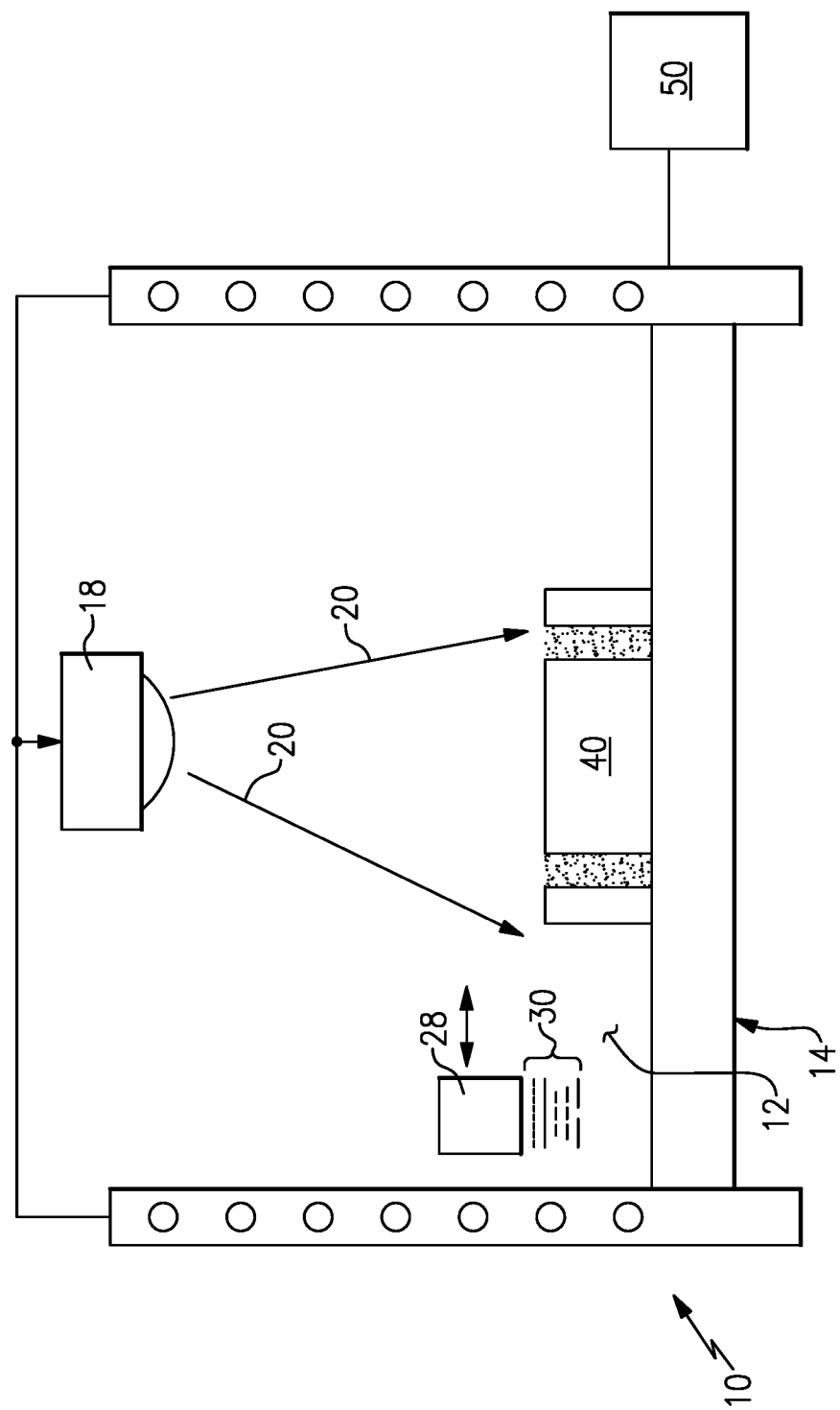
FIG. 1 schematically illustrates an exemplary additive manufacturing machine.

FIG. 1 schematically illustrates an exemplary additive manufacturing machine 10 configured to create a gaspath component. The additive manufacturing machine 10 includes a work space 12 that supports an energy transmitting device 18 and a base plate 14 on which a part 40 is supported during fabrication. In this example, the energy-transmitting device 18 emits a laser beam 20 that melts material 30 deposited by a material applicator 28. The example material 30 is a metal powder that is applied in a layer over the base plate 14 and subsequent layers are applied to produce a desired configuration of the part 40. The laser beam 20 directs energy that melts the powder material in a configuration that forms the desired part dimensions.

The additive manufacturing process utilizes material 30 that is applied in layers on top of the base plate 14. Selective portions of the layers are subsequently melted by the energy emitted from the laser beam 20. The energy focused on the top layer of the part 40 generates the desired heat to melt portions of the powdered metal. Conduction of heat through the solidified portions of the part and convection cooling to the ambient environment solidifies the melded portions to build and grow the part 40. The melting and solidification process is repeated layer by layer to build the part 40.

In a practical implementation, the additive manufacturing machine 10 is controlled via a computer 50, or other similar controller, that is connected to the additive manufacturing machine 10. Alternatively, the computer 50 can be integrated into the additive manufacturing machine 10. In either case, a completed part specification is entered into the computer 50 and the computer 50 determines how to construct the part 40 based on the particular additive manufacturing process of the additive manufacturing machine 10.

Figure 2:
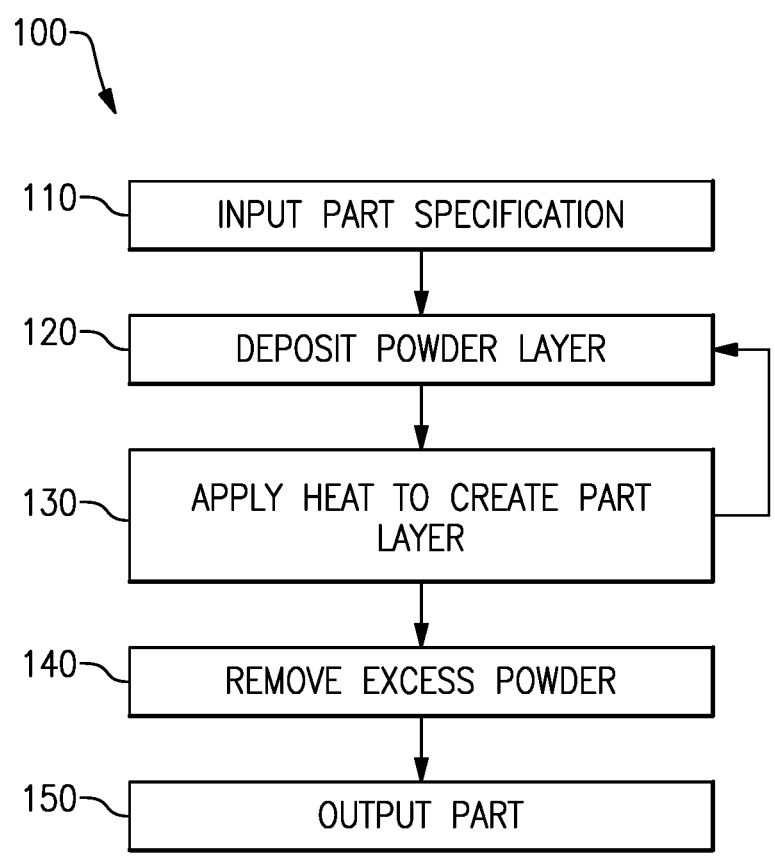
FIG. 2 illustrates a method for producing a gaspath component using the additive manufacturing machine of FIG. 1.

With continued reference to FIG. 1, FIG. 2 schematically illustrates an exemplary process 100 utilized by the additive manufacturing machine 10 to generate a part 40. Initially a user inputs the part specification into the computer 50 in an "Input Part Specification" step 110. The computer 50 then determines the appropriate layers, and additive process to generate the desired part 40. In alternative systems, the appropriate layers and process to generate the desired part 40 can be determined prior to inputting the specification, and the specification itself can include each of the desired layers.

Once the desired layers and processes are determined by the computer 50, the additive manufacturing machine 10 deposits a layer of powder on the base plate 14 in a "Deposit Powder Layer" step 120. In some examples, the material applicator 28 is configured to deposit only a single material, and every iteration of step 120 deposits the same material. In other examples, the material applicator 28 can deposit multiple different materials, and each iteration can deposit the same or different materials from the previous iteration, depending on the needs of the specific process. In yet other examples, the material applicator 28 can deposit different materials in different locations within a single iteration of the deposit powder layer step 120.

Once the layer has been deposited, the additive manufacturing machine 10 applies heat to the powder via the energy transmitting device 18 in an "Apply Heat to Create Part Layer" step 130. The heat melts the powder in a specific location adhering the layer to any previous layers, and causing the layer to be generated in the specific desired shape. Steps 120 and 130 are then iterated multiple times to create the desired three dimensional geometry of the part 40 being generated.

Once the full three dimensional geometry has been created, the excess unmelted powder is removed from the part 40 in a "Remove Excess Powder" step 140. The excess powder can be removed using any conventional means including, but not limited to, vibrations, air pressure, washing and the like. After removing the excess powder, the completed part is output in an "Output Part" step 150.

In some examples, the output part 150 can be further subjected to finishing processes such as polishing, application of additional coatings via vapor deposition and the like, or any other finishing process such as hot isostatic pressing, extrude hone, etc.

Some exemplary gaspath components, such as turbine blades, turbine vanes, blade outer air seals, and the like, are exposed to high temperature gasses during operation of a gas turbine engine. While illustrated herein with specific regards to an exemplary turbine blade, one of skill in the art having the benefit of this disclosure will understand that the disclosed concepts cover any gaspath component including internal cooling passages, and are not limited to the expressly illustrated example. In order to mitigate thermal stresses on the gaspath component, internal cooling passages are included within the body of the gaspath component, and allow a cooling fluid to be passed through the gaspath component. In some examples, cooling fluid, such as air from a compressor bleed, is provided to an inlet of the internal cooling passage at a pressure greater than a desired pressure within the cooling passage.

To reduce the pressure, metering features are added to the gaspath component at the inlet of one or more internal cooling passages. With current casting and milling manufacturing techniques, the metering feature typically constitutes a plate having an opening. The plate is welded, or otherwise attached, to the gaspath component immediately upstream of the inlets. Attaching the metering feature post completion of the part requires additional manufacturing time and manufacturing expense, and can introduce additional failure points due to the attachment features.

Figure 3:
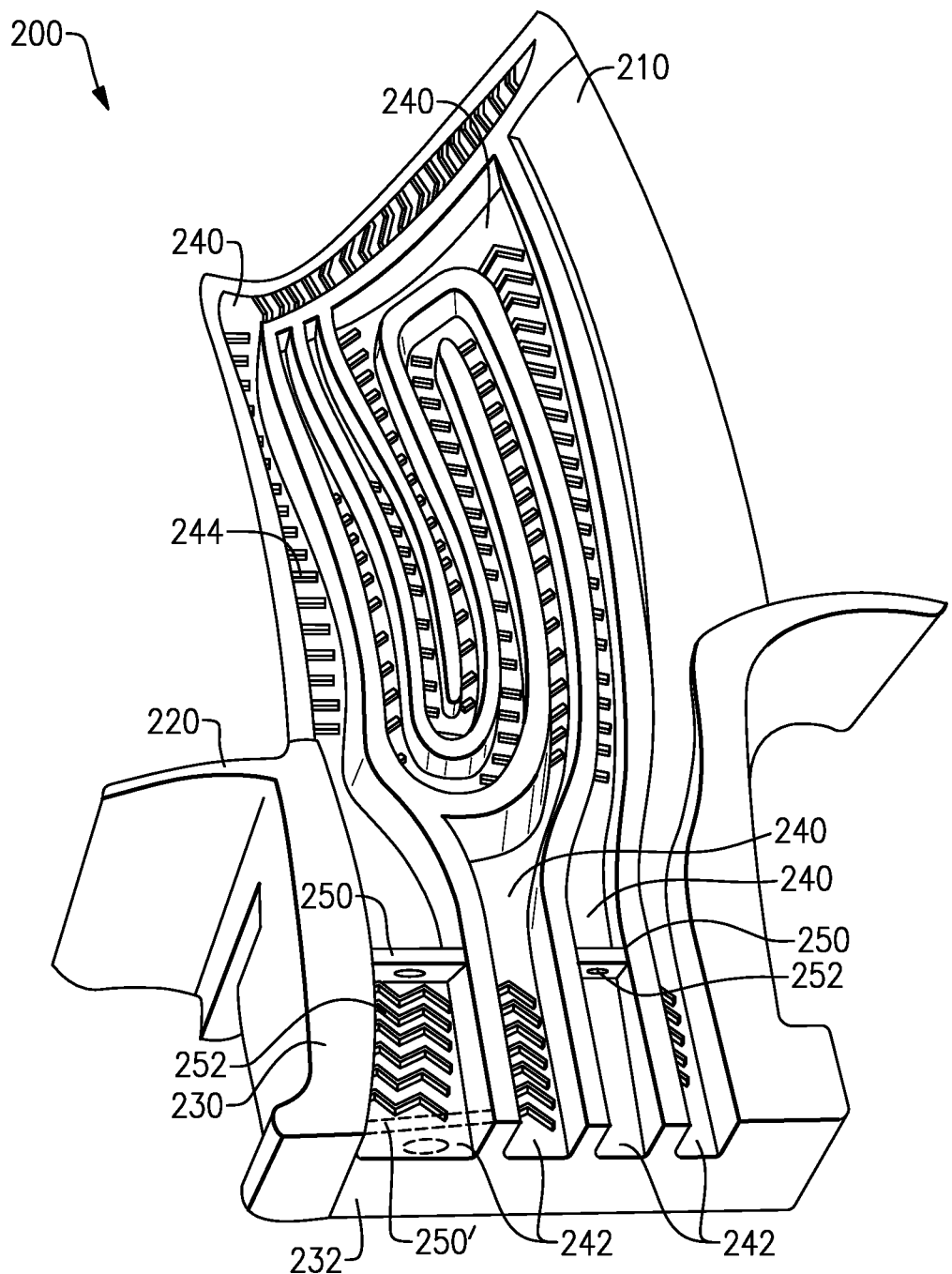
FIG. 3 schematically illustrates an isometric cross section of an exemplary additively manufactured blade.
Figure 4A:
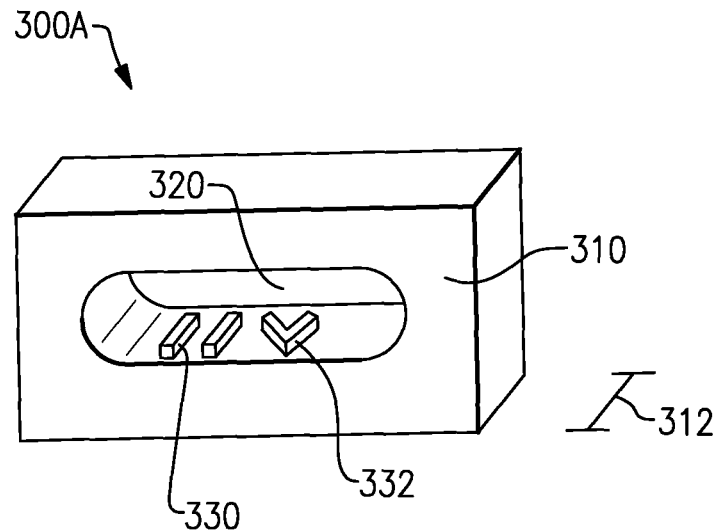
FIG. 4A schematically illustrates a first example metering feature for inclusion in the additively manufactured blade of FIG. 3.
Figure 4B:
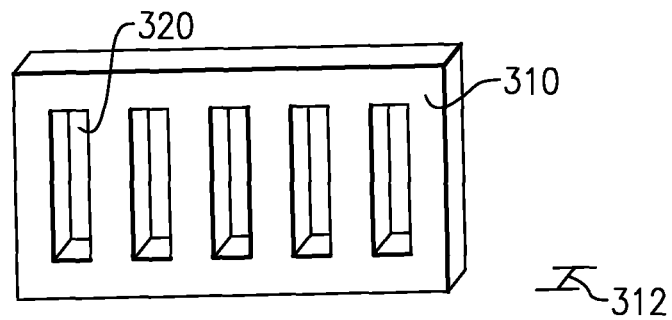
FIG. 4B schematically illustrates a second example metering feature for inclusion in the additively manufactured blade of FIG. 3.
Figure 4C:
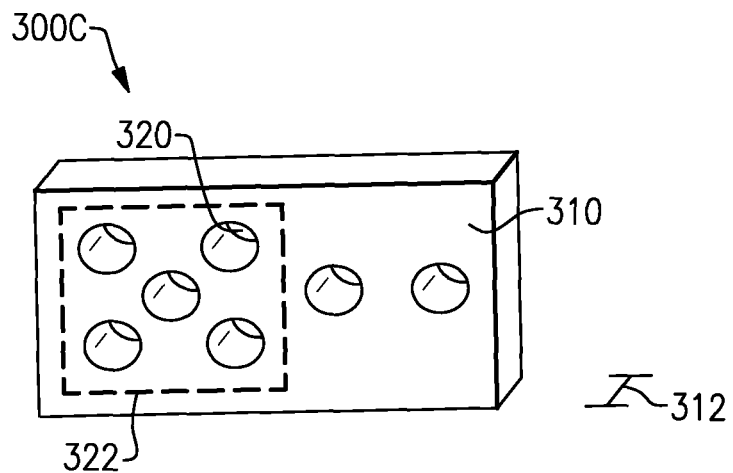
FIG. 4C schematically illustrates a third example metering feature for inclusion in the additively manufactured blade of FIG. 3.

With continued reference to FIGS. 1 and 2, FIG. 3 schematically illustrates an additively manufactured gaspath component 200, including a blade 210 extending outward from a platform 220. Extending opposite the blade 210, also from the platform 220, is a root 230. Within the gaspath component 200 are multiple internal cooling passages 240. In the illustrated example, the internal cooling passages 240 include inlets 242 at a radially inward portion of the root 230, relative to an installed position of the gaspath component 200. In alternative examples, the inlets 242 can be positioned anywhere on the root 230 or platform 220. Within each internal cooling passage 240 are multiple turbulating features 244. In the illustrated example, the turbulating features 244 are trip strips. In alternative examples, the turbulating features 244 can be any other surface feature configured to induce turbulence on the coolant flowing through the internal cooling passage 240.

Also included within a portion of the internal cooling passages 240 are metering features 250. The exemplary metering features 250 are metering plates that span the internal cooling passage 240 approximately normal to the expected direction of coolant flow through the cooling passage 240. In alternative examples, the metering feature 250 can be angled relative to the expected coolant flow and function in approximately the same manner.

Each of the metering features 250 includes an opening 252 that allows fluid flow through the metering feature 250. The volume of fluid flow through the metering feature 250 is limited by the cross sectional area of the opening 252, or openings 252, thereby metering the flow of fluid into the internal cooling passage 240. In alternative examples, a metering feature 250' can be positioned at the inlet 242 of the internal cooling passage 240 instead of downstream of a portion of the turbulating features 244, while still being interior to the internal cooling passage 240. In the alternative example, the metering feature 250' does not extend beyond a base portion 232 of the root 230.

As described above, the gaspath component 200 is constructed via an additive manufacturing process. During the additive manufacturing process, the metering feature 250 is constructed internal to, and simultaneous with, the cooling passage 240, without extending beyond the base portion 232 of the root 230. In some examples, the metering feature 250 can further be included downstream of one or more of the turbulating features 244. By including the metering feature 250 downstream of a portion of the turbulating features 244, desirable flow characteristics can be imparted on the cooling fluid prior to metering, as well as after the metering.

With continued reference to FIGS. 1, 2 and 3, FIGS. 4A-4C illustrate exemplary metering features 300A-C that can be included in the gaspath component 200 of FIG. 3 as the metering feature 250. Each of the metering features 300A-C includes a plate portion 310 with a thickness 312 aligned with the expected direction of fluid flow through the metering feature 300A-C. Existing manufacturing methods, where the metering plate is attached post completion of the gaspath component 200, are generally limited in the thickness of the metering plate that can be attached. By way of example, the thickness in a typical metering plate for aerospace High Pressure Turbine Blades is limited to being between 9 and 36 mils. In the exemplary additively manufactured gaspath component 200, the additive manufacturing process allows for a substantially wider range of thickness to be constructed, in addition to allowing the metering feature 250, 300 to be constructed internal to the cooling passage itself. In some examples, the metering feature 250, 300 can be at most 8 mils thick. In alternative examples, the metering feature 250, 300 can be in the range of 37-60 mils.

The metering features 300A-C include openings 320 that allow fluid to pass through the metering feature 300, 250 in a controlled volume. One of skill in the art, having the benefit of this disclosure, will appreciate that any number of distinct opening shapes and configurations can be utilized, including singular hole openings 320 (as in FIG. 3A), multiple evenly distributed openings 320 (as in FIG. 3B), and multiple unevenly distributed openings 320 (as in FIG. 3C). In some examples, such as the example of FIG. 4C, the unevenly distributed openings 320 can be concentrated in a single region 322 in order to increase the volume of coolant entering the cooling passage 240 in that region 322 relative to the coolant entering the cooling passage 240 outside of the region 322. Due to the additive manufacturing process, the metering features 300A-C can include any, or all, of the above configurations within the cooling passages 240 themselves.

In some examples, the metering feature 300A includes multiple geometric features 330, 332 on the surface of the opening 320. While illustrated as included in the opening 320 of metering feature 300A, one of skill in the art, having the benefit of this disclosure, will understand that the geometric features 330, 320 can be applied to any metering feature 300A-C created using the process described herein. The geometric features 330, 332 operate to turbulate the coolant passing through the metering feature 300A, as it is passing through the opening 320. In alternative examples, the downstream portion of the opening 320 can have a smaller surface area, resulting in a tapered opening 320.

Further, as the gaspath component 200 and the metering feature 250 are additively manufactured simultaneously, each of the metering features 250 is integral to the body of the gaspath component 200. In some examples, the metering features 250, 300 are the same material as the body 200, and form a unitary structure. In alternative examples, the metering features 250, 300 are a distinct material utilized during the additive manufacturing process. In the alternative examples, the distinct material is additively manufactured to be integral to, and a part of, the body 200.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. A gaspath component comprising:
   a body having at least one internal cooling passage;

a metering plate integral to said internal cooling passage, the metering plate spanning said internal cooling passage and including at least one opening, the at least one opening includes at least one geometric feature protruding into said opening; and the metering plate and the body being a unitary structure.

2. The gaspath component of claim 1, wherein the body and the metering plate are comprised of the same material.

3. The gaspath of claim 1, wherein the at least one internal cooling passage includes at least one turbulating feature.

4. The gas path component of claim 3, wherein the at least one turbulating feature is a plurality of trip strips.

5. The gaspath component of claim 3, wherein the metering plate is downstream of at least one of said at least one turbulating features.

6. The gaspath component of claim 1 wherein the metering plate includes a plurality of openings.

7. The gaspath component of claim 6, wherein the at least one opening is tapered.

8. The gaspath component of claim 1, wherein the at least one internal cooling passage is a plurality of cooling passages, wherein a first subset of said cooling passages include the metering plate and a second subset of cooling passages are characterized by a lack of the metering plate.

9. The gaspath component of claim 1, wherein the metering plate is internal to said at least one internal cooling passage.

10. The gaspath component of claim 1, wherein the metering plate has a thickness parallel to an expected flow of fluid through the metering plate, and the thickness is at least 37 mils.

11. The gaspath component of claim 1, wherein the metering plate has a thickness parallel to an expected flow of fluid through the metering plate, and the thickness is at most 8 mils.

12. The gaspath component of claim 1, wherein the body and the metering plate are a single additively manufactured component.

13. The gaspath component of claim 1, wherein the at least one geometric feature includes at least one v-shaped geometric feature protruding toward a centerline of the opening.

14. The gaspath component of claim 1, wherein the at least one geometric feature includes at least one bar shaped geometric feature protruding toward a centerline of the opening.

* * * * *